Feb. 23, 1954 D. MITCHELL 2,670,435

RADIOTELEPHONE COMMUNICATION SYSTEM

Filed Feb. 2, 1951 2 Sheets-Sheet 1

INVENTOR
D. MITCHELL
BY B. F. Stoddard
ATTORNEY

Feb. 23, 1954 D. MITCHELL 2,670,435

RADIOTELEPHONE COMMUNICATION SYSTEM

Filed Feb. 2, 1951 2 Sheets-Sheet 2

INVENTOR
D. MITCHELL
BY B. J. Stoddard
ATTORNEY

UNITED STATES PATENT OFFICE 2,670,435

RADIOTELEPHONE COMMUNICATION SYSTEM

Doren Mitchell, Martinsville, N. J., assignor to Bell Telephone Laboratories, Incorporated, New York, N. Y., a corporation of New York Application February 2, 1951, Serial No. 209,015

3 Claims. (Cl. 250—6)

Figure 1:
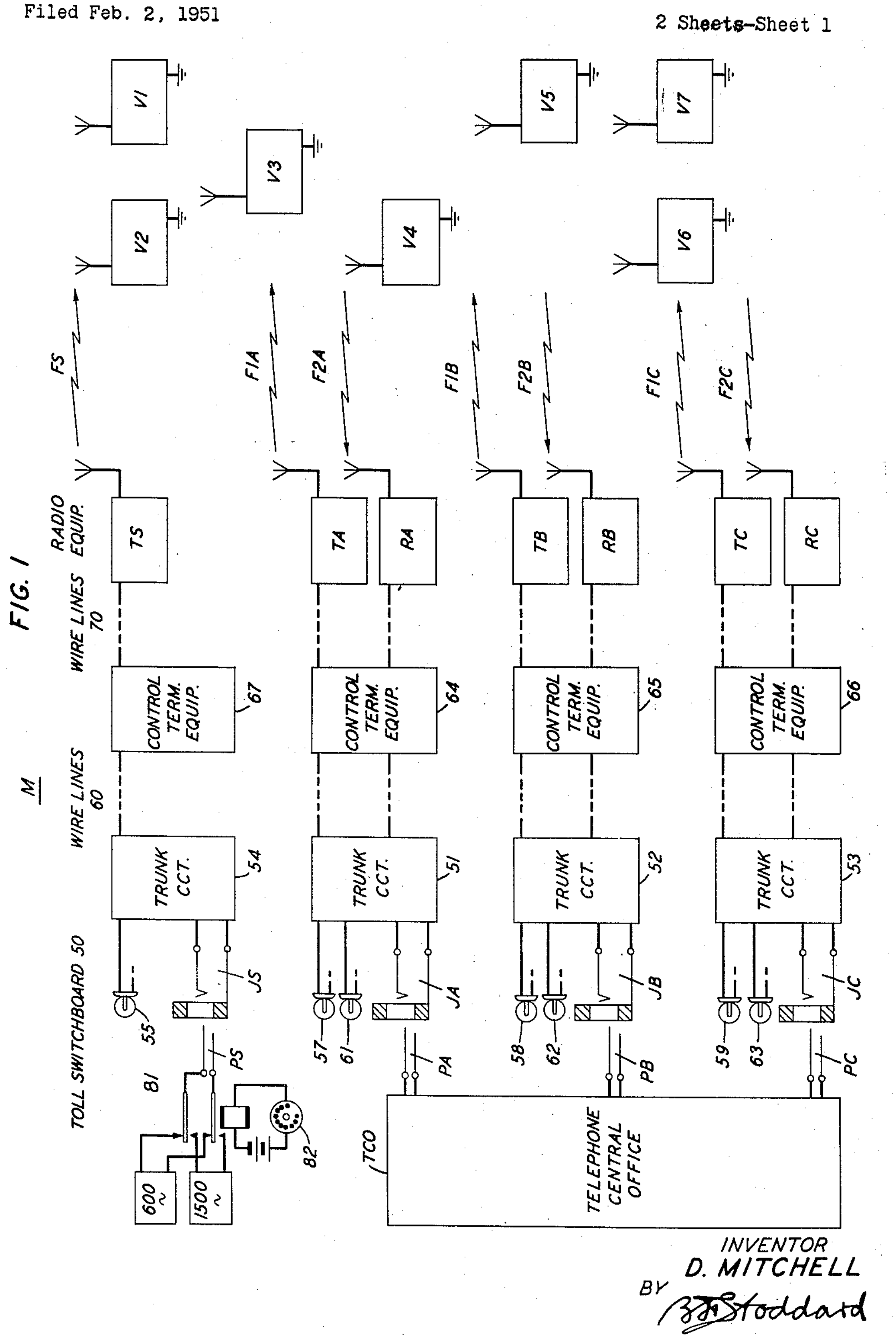

This invention relates to radiotelephone communication systems and, more particularly, to a two-way radiotelephone communication system having a plurality of stations equipped for alternative transmission and reception of signal-modulated carrier waves over any one of a plurality of different radiant energy communication channels, each channel comprising one frequency allocation for the transmission of carrier waves and another frequency allocation for the reception of carrier waves.

Various types of two-way radiotelephone systems are known in the art. Some of these systems employ a single two-frequency radiant energy channel which is used by the customers at all the stations within the system in much the same manner as a conventional telephone party line. Since this single communication channel is common to all the customers' stations, it can be understood that its use should be restricted to transmission from only one customer's station at any one time. This is accomplished in accordance with the general practice by providing each customer's station with a lock-out device. These devices are well known in the art and are of various designs. Briefly stated, they all have a common function; namely, the disabling of the radio transmitting equipment at all of the customers' stations except the station which is transmitting over the common channel at that time. The operation of this type of system is satisfactory as long as the calling rate is not high, but, when the calling rate is high, the quality of service is subject to degradation because considerable delays in initiating calls will be encountered due to the single channel being busy a large part of the time.

Such degradation of service is avoided to a certain extent by another type of two-way radiotelephone system which employs several different two-frequency radiant energy channels for use within a particular service area, the customers within this area being divided into a plurality of groups and each of the channels being assigned to a different group for the exclusive use, on a party line basis, by all of the customers within the assigned group. Since each channel is used on a party line basis by all the customers in the group to which it is assigned, each customer's station is provided with a lock-out device as described above. Thus, when any one customer in a particular group is transmitting over his assigned channel, all of the other customers in that group will be prevented from transmitting over the assigned common channel. This multichannel system is useful in areas having a large number of customers, but is not entirely satisfactory because delays in initiating calls will still be encountered whenever the calling rate of any group is high.

It has been discovered that such delays encountered by customers in any one of the groups frequently occur during periods when other groups of customers are not using their assigned channels. In other words, on many occasions when a customer is prevented from initiating a call due to his assigned channel being busy, one or more of the other channels in the system will be idle. Therefore, it can be understood that the number of such delays in initiating calls would be appreciably reduced if each of the customers, instead of being restricted to a single assigned channel, could initiate a call over any idle channel.

Accordingly, it is an object of this invention to provide each customer's station in a two-way multichannel radiotelephone system with channel selecting equipment for selecting any one of the channels that is in an idle condition.

This and other objects of the invention are accomplished in a multichannel radiotelephone system by means which include providing each customer's station with channel-selecting equipment for tuning the customers' transmitting and receiving equipments to any one of the channels assigned to the system. Since each communication channel comprises two frequency allocations, one for transmitting and the other for receiving, the channel-selecting equipment at each customer's station is designed to tune the associated transmitting and receiving equipments to their proper companion frequencies each time a change is made from one channel to another. In order to prevent interference with a channel already in use, each customer's station is provided with means for disabling its telephone transmitter and receiver whenever a busy channel is selected. At the same time, an indicating device is operated so that the customer will know that his station equipment is in a disabled condition and that another channel should be selected. When an idle channel is selected, the customer's transmitting and receiving equipments are conditioned for use and the operation of the indicating device is discontinued thereby informing the customer that his station equipment is tuned to an idle channel and is ready for purposes of communication.

Figure 2:
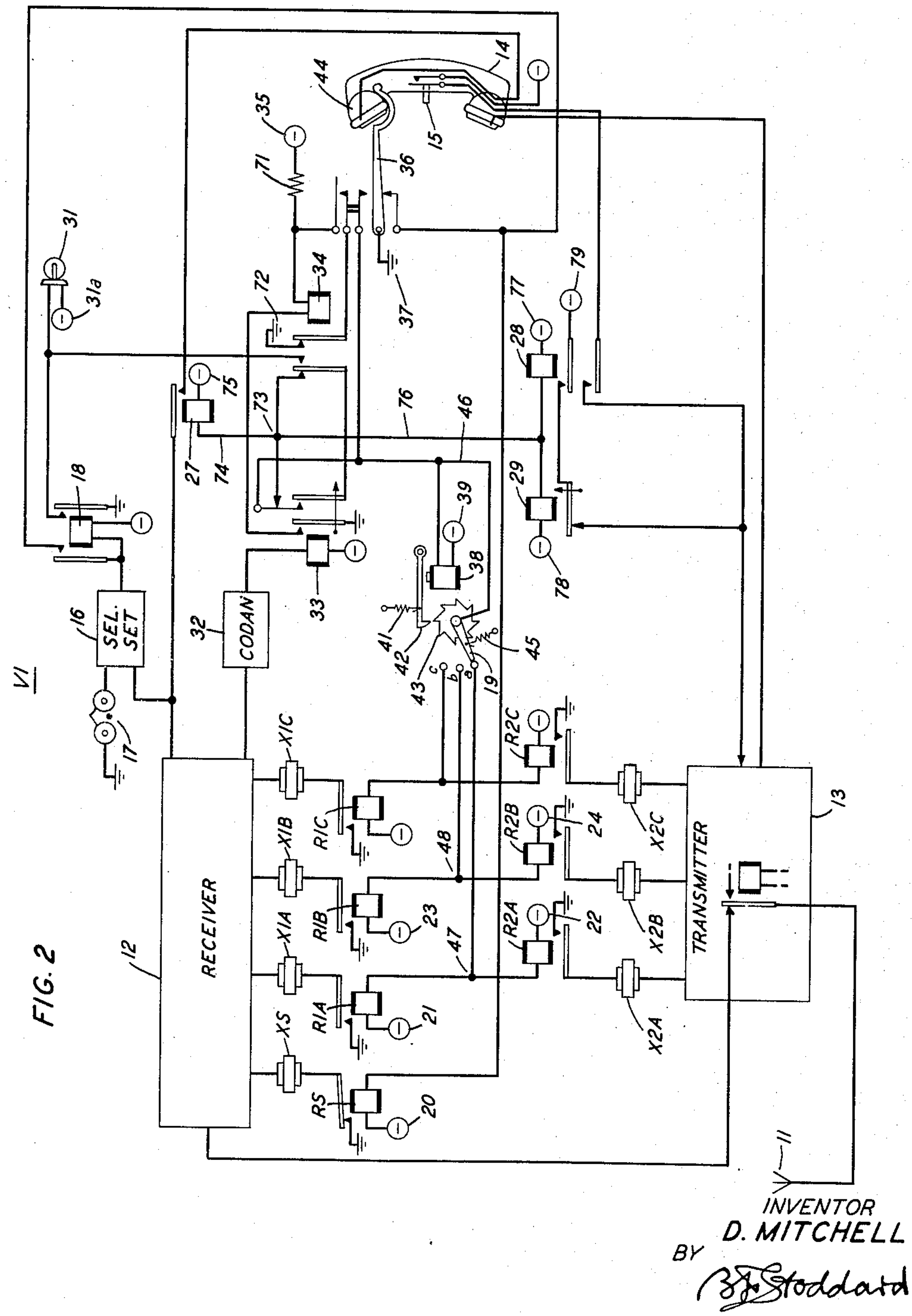

These and other features of the invention are more fully discussed in connection with the following detailed description of the drawing in which:

Fig. 1 is a schematic diagram of a two-way multichannel radiotelephone communication system having a main station and a plurality of customers' stations; and Fig. 2 is a circuit diagram of a customer's radiotelephone transmitting and receiving station.

The radiotelephone system shown in Fig. 1 comprises a main station M and a plurality of customers' stations V1 to V7, inclusive. In one embodiment of the invention, the customers' stations V1 to V7, inclusive, are mobile and are constituted by radiotelephone transmitting and receiving equipments mounted in vehicles, such as automobiles, moving about within the area served by the main, or base, station M which is located in a fixed position. The invention is not restricted to use with systems having customers' stations that are mobile, but may be applied to other types of systems in which all the stations are fixedly located. Radiotelephone communication between the mobile stations V1 to V7, inclusive, and the fixedly located base station M is effected over three radiant energy communication channels which may be referred to as channels A, B, and C. Each of these three channels comprises two frequency allocations for the transmission of carrier waves in opposite directions. Thus, channel A comprises frequency allocations F1A and F2A, channel B has frequencies F1B and F2B, and channel C has frequencies F1C and F2C. If desired, these frequency allocations F1A to F2C, inclusive, may be closely spaced within an assigned portion of the frequency spectrum. In addition to these three communication channels, the system also includes a fourth radiant energy channel having only one frequency allocation FS for use in transmitting selective calling signals from the base station M to the customers' mobile stations V1 to V7, inclusive. It is to be understood that the invention is not limited to the specific number of mobile stations indicated in the drawing nor to the use of three two-way communication channels as these have been set forth for purposes of description and a larger or smaller number of stations and channels may be employed if desired.

In the drawing, only the customer's station V1 has been illustrated in detail as it is to be understood that the other vehicular stations V2 to V7, inclusive, are of similar design. The station V1 is shown in Fig. 2 to be provided with an antenna 11 and conventional radiotelephone receiving and transmitting equipments 12 and 13, respectively, which are coupled to the usual telephone handset 14 equipped with a standard push-to-talk button 15. The output of the radio receiver 12 is also coupled to selective signal receiving equipment 16, which is of the type described by B. P. Cottrell in an article entitled "Selective Calling for Mobile Telephone Service" and published on pages 32 to 34, inclusive, of "FM and Television," issue of January 1948. As is explained in this article, the equipment 16 is designed to effect the ringing of a call bell 17 and the energization of a call relay 18 in response to the reception by the radio receiver 12 of an assigned selective calling signal.

In accordance with the invention, the vehicular station V1 also includes a channel-selecting switch 19 for effecting the selective connection of a number of quartz crystals X1A, X2A, X1B, X2B, X1C, and X2C to frequency-determining circuits associated with the receiving and transmitting oscillators in the receiving and transmitting equipments 12 and 13, respectively. These frequency-determining circuits may be of any appropriate design known to those skilled in the art. The actual switching of the crystals is accomplished by a plurality of relays R1A, R2A, R1B, R2B, R1C, and R2C in a manner somewhat similar to that disclosed in Patent 2,575,363 issued to B. H. Simmons on November 20, 1951, which describes means whereby the frequency of the electric wave energy generated by an oscillator can be readily changed by substituting one crystal for another. The station V1 is further provided with other equipment and apparatus that is described hereinafter.

The base station M is somewhat similar to the base station disclosed by A. C. Peterson in an article entitled "Vehicle Radiotelephony Becomes a Bell System Practice" and published in volume 25 of the "Bell Laboratories Record" on pages 137 to 141, inclusive, the chief difference being that the station disclosed in the article is for use in a single channel system, whereas the base station M is designed for use in a multichannel system. Due to this difference, the base station equipment disclosed in the article is duplicated at the station M for each of the channels A, B, and C. Thus, station M is provided with a toll switchboard 50 comprising a plurality of trunk circuit equipments 51, 52, and 53, each of which includes a jack JA, JB, and JC, respectively, each jack being assigned for use with a different one of the three channels A, B, and C. A plurality of plugs PA, PB, and PC, which are coupled in any suitable manner to a telephone central office TCO, are provided for insertion into any one of the jacks JA, JB, and JC. Associated with the jacks JA, JB, and JC are the usual line lamps 57—58—59 and busy lamps 61—62—63. The trunk circuit equipments 51, 52, and 53 at the toll switchboard 50 are connected by wire lines 60 to three corresponding sets of terminal equipments 64, 65, and 66 which, in turn, are connected by other wire lines 70 to their respectively associated radio transmitters TA—TB—TC and radio receivers RA—RB—RC.

These radio transmitters and receivers are individually tuned to the various channel frequencies; that is, the transmitter TA is tuned to transmit carrier waves having the frequency F1A and its associated receiver RA is tuned to receive radiant energy having the frequency F2A, these being the two frequencies allocated to channel A as was stated above. Similarly, the transmitter TB and receiver RB are tuned respectively to frequencies F1B and F2B which are the frequencies allocated to channel B, and the transmitter TC and receiver RC are tuned to frequencies F1C and F2C, respectively, which are allocated to channel C.

It is to be understood that, in accordance with the method of operation discussed in the above-mentioned Peterson article, the main station M may be provided with a plurality of groups of fixedly located radio receivers, each group being tuned to a different channel. It is to be further understood that, as is mentioned in the Peterson article referred to above, the various equipments, particularly the fixedly located radio receivers, constituting the base station M need not necessarily all be located in the same building.

In order to transmit selective calling signals to the customers' stations V1 to V7, inclusive, the main station M is provided with conventional selective calling equipment 81 for producing short signal pulses of 600 to 1500 cycles which are alternated in accordance with the operation of a dial 82 in a manner similar to that disclosed by C. N. Anderson and H. M. Pruden in an article entitled "Radiotelephone System for Harbor and Coastal Services" and published on pages 245 to 253, inclusive, of the "Proceedings of the Institute of Radio Engineers," vol. 27, 1939. The selective calling equipment 81 is supplied with a plug PS for insertion into a jack JS associated with another trunk circuit equipment unit 54 having a busy lamp 55. This trunk circuit equipment 54 is connected by means of one of the wire lines 60 to an additional terminal equipment unit 67 which applies the 600 and 1500 cycle pulses over one of the wire lines 70 to a fourth radio transmitter TS for modulating its carrier energy. The carrier energy produced by the transmitter TS has a frequency FS which is different from the frequencies F1A to F2C, inclusive, and which may be considered as constituting a calling channel. In order that the selective calling signals may be readily received at all the customers' stations V1 to V7, inclusive, the channel selecting equipment at each station is designed, as is described hereinafter, to tune its associated radio receiver to the calling channel frequency FS whenever its associated station equipment is in an idle condition.

The operation of the system may be better understood by considering the procedure that is followed in placing a call from the base station M to any one of the customers' stations V1 to V7, inclusive, such as to the station V1 which is shown in detail in Fig. 2. When a call comes in to the toll switchboard 50, such as from the telephone central office TCO, the operator first looks at the busy lamp 55 associated with the common calling channel trunk equipment 54. If this lamp 55 is lighted due to some other operator calling a customer, then the operator must wait her turn. If the lamp 55 is not lighted, the operator inserts the plug PS into the jack JS and, since the calling carrier energy FS is radiated continuously by the transmitter TS, immediately proceeds to rotate the dial 82 to effect the modulation of the carrier energy FS with the particular combination of 600 to 1500 cycle pulses that is assigned to the station V1.

The resulting selective calling signal is received at all the idle vehicular stations due to their radio receivers being tuned to the calling channel as was stated above, but, as this particular calling signal is assigned to only the station V1, only the selective signal receiving equipment 16 at the station V1 will respond to this calling signal. Therefore, when the calling signal is received at station V1, it causes the signal receiving equipment 16 to effect the ringing of the call bell 17 and the energization of the call relay 18 which operates its armatures, the operation of its right armature closing an obvious circuit for lighting the call lamp 31. Since the calling carrier FS is radiated continuously and since each idle customer's station is tuned to the calling channel, the customer's codan 32 at station V1 will be operated during idle periods. Operation of the codan 32 effects the energization of the codan relay 33 which operates its armatures, the inner armature connecting ground to the winding of a relay 34 thereby closing a path for current from battery 35 to effect the energization of relay 34 for purposes described hereinafter.

The operation of the left armature of the call relay 18 closes a locking circuit for relay 18 extending to ground 37 over the bottom contact of the hook switch 36, this contact being now closed due to the hook switch 36 holding the handset 14. Any other suitable contact-operating holder for the handset 14 may be used instead of the hook switch 36 if desired. The purpose of this locking circuit is to maintain the call lamp 31 lighted after a call is abandoned without being answered. There are occasions when a customer does not answer a call for various reasons, such as being absent from his station. On such occasions, the operator will abandon the call and will send a clearing pulse to stop the bell 17 from ringing. This will not extinguish the lamp 31 since the locking circuit for the call relay 18 will remain closed. Thus, when the customer returns to his station, the lighted call lamp 31 serves to inform him that his station was called during his absence. He should then remove his handset 14 from the hook switch 36 and call the operator at the main station M.

If the customer is at his station when the call is received, he will presumably answer it immediately by removing his handset 14 from the hook switch 36. This permits the bottom hook switch contact to open thereby opening the locking circuit of the call relay 18. It should be noted at this point, that, when the station V1 was in an idle condition, a path was closed from ground 37 over the bottom hook switch contact and then through the winding of a channel-selecting relay RS to battery 20 thereby energizing relay RS and causing it to operate its armature to connect ground to the quartz crystal XS. This serves to connect the crystal XS to a frequency-determining circuit associated with the receiving oscillator in the radio receiver 12 in a manner similar to that described in the above-mentioned application of B. H. Simons. Thus, in the idle condition, crystal XS functions to cause the radio receiver 12 to respond to selective calling signals with which the calling carrier FS is modulated. This condition exists at all of the customers' stations V1 to V7, inclusive, whenever they are idle in order that they may readily receive selective calling signals transmitted from their base station M. The reception of a selective calling signal does not of itself cause the de-energization of the channel-selecting relay RS as its energizing circuit remains closed until the subscriber answers the call by removing his handset 14 from the hook switch 36. The removal of the handset 14 permits the bottom hook switch contact to open, as was described above, thereby opening the energizing circuit of relay RS. Upon being thus de-energized, relay RS releases its armature to discontinue the control of the receiving oscillator by the crystal XS.

At this same time, the middle hook switch contact becomes closed and connects ground 37 over an obvious circuit to the winding of a ratchet lock relay 38 thereby enabling current from battery 39 to energize relay 38. The armature of relay 38 is normally biased in its unoperated position by any suitable means, such as a spring 41. When this armature is moved to its operated position in response to the energization of relay 38, it moves a pawl 42 into engagement with a tooth of a ratchet 43. Attached to the ratchet 43 for movement therewith is a channel-selecting switch arm 19 composed of electrically conductive material and adapted to engage any one of a plurality of channel-selecting contacts *a*, *b*, and *c*. This switch arm 19 is biased by a spring 45 in such a manner that, when the ratchet 43 is released by the pawl 42, the switch arm 19 is pulled by the spring 45 into engagement with contact *a*. This is the normal position of the switch arm 19 because, in the idle condition, the ratchet lock relay 38 is de-energized and the pawl 42 is held in its retracted position by the spring 41. Therefore, when the middle hook switch contact becomes closed, it applies ground 37 to conductor 46 thus completing a path extending over switch arm 19 and contact *a* to the junction point 47. This permits current from batteries 21 and 22 to flow through the windings of relays R1A and R2A, respectively, to the junction point 47 and then over the above-mentioned path to ground 37. Relays R1A and R2A consequently become energized and operate their armatures to apply ground to the crystals X1A and X2A which are connected to the frequency-determining circuits associated with the receiving and transmitting oscillators, respectively, thus preparing both the receiver 12 and the transmitter 13 for operation over channel A.

If it be now assumed that channel A is busy, then the transmitter TA at the base station M will be radiating the carrier F1A which, upon being received at the customer's station V1, will cause the radio receiver 12, now tuned by the crystal X1A to the frequency F1A, to operate the codan 32 which, in turn, will energize the codan relay 33. Since the codan relay 33 is of the slow-to-release type having a delay period of around 0.1 second and since the interval of time between the switching from crystal XS to crystal X1A is less than 0.1 second, the armatures of relay 33 will be held operated without interruption. Accordingly, the circuit for energizing relay 34 will be maintained closed by the operated inner armature of relay 33. Similarly, the outer armature of relay 33 will be held operated thereby holding open its normally closed set of contacts with the result that the energizing circuits of the receiver control relay 27 and the transmitter start relays 28 and 29 will also be open and their armatures will not be operated.

Therefore, the circuit extending from the radio receiver 12 to the earphone 44 in the handset 14 will be open at the armature and contact of the receiver control relay 27 thus preventing the customer at station V1 from listening in on channel A. In addition, the customer's starting circuit extending from the transmitter 13 to the push-to-talk button 15 on the handset 14 will be open at the lower armature and contact of relay 28. This renders operation of the push-to-talk button 15 ineffectual to start the transmitter 13 thereby preventing the customer at station V1 from transmitting over channel A at this time. Since relay 34 is energized, its armatures are operated and, consequently, a circuit is closed extending from ground 37, over the closed middle hook switch contact, over the now closed normally open make-before-break contacts of the outer armature of relay 33, operated outer armature and contact of relay 34, and then through the call lamp 31 to battery 31*a*. The closure of this last-mentioned circuit maintains the call lamp 31 lighted without any interruption at this time thereby informing the customer at station V1 that channel A is busy. Thus, the lamp 31 functions both as a call lamp and as a busy lamp.

Upon noticing that the lamp 31 remains lighted, the customer at station V1 proceeds to select another channel by manually moving the channel-selecting switch arm 19 to its associated contact *b*. This opens the energizing circuits of relays R1A and R2A which release their armatures to discontinue control of the receiving and transmitting oscillators by the crystals X1A and X2A. Due to the ratchet lock relay 38 being maintained in an energized condition, its armature forces the pawl 42 into engagement with a tooth of the ratchet 43 thereby holding the switch arm 19 on the contact *b*. With the switch arm 19 thus held on the contact *b*, current from batteries 23 and 24 will now flow through the windings of relays R1B and R2B, respectively, to the junction point 48, contact *b*, switch arm 19, conductor 46, and then over the middle hook switch contact to ground 37. Upon being thus energized, relays R1B and R2B operate their armatures to connect ground to the frequency-determining crystals X1B and X2B, respectively, to prepare the receiver 12 and transmitter 13 for operation over channel B.

If it be assumed that channel B is idle, then the transmitter TB at the base station M will not be radiating any carrier energy because in this type of system no carrier is radiated over an idle channel. Due to this absence of carrier energy, the operation of the codan 32 is discontinued with the result that the codan relay 33 is de-energized and, after the expiration of its delay period releases its armatures. The release of the outer armature of relay 33 permits its associated contacts to return to their normal condition shown in the drawing thus closing a path extending from ground 37 to the junction point 73 and then along a conductor 74 and through the winding of the receiver control relay 27 to a battery 75. Relay 27 consequently becomes energized and operates its armature to connect the customer's earphone, or telephone receiver, 44 to the radio receiver 12. Since the now-grounded junction point 73 is coupled by a conductor 76 to the windings of the transmitter start relays 28 and 29, current from batteries 77 and 78 will now energize relays 28 and 29, respectively, and cause them to operate their armatures. The operation of the outer armature of relay 28 completes an obvious enabling circuit for the push-to-talk button 15 so that the transmitter 13 will produce carrier energy of the frequency F2B when the customer at station V1 presses the push-to-talk button 15. The operation of the inner armature of relay 28 and the armature of relay 29 perform a function that is described hereinafter.

The release of the inner armature of relay 33 opens the above-described energizing circuit of relay 34 which, in turn, releases its armatures. The inner armature of relay 34 now engages its contact to complete a path for current from battery 35 to flow through resistor 71 and over the upper hook switch contacts, which are now closed due to the handset 14 having been removed from the hook switch 36, and then to ground 72. The closing of this shunt circuit across the winding of relay 34 serves to lock relay 34 in its unenergized condition so that it cannot again be energized until the upper hook switch contacts are opened by the replacing of the handset 14 on the hook switch 36. The release of the outer armature of relay 34 opens the lighting circuit of the lamp 31. Lamp 31 consequently now becomes extinguished thus indicating to the customer at station V1 that he has now selected an idle communication channel.

The above-mentioned operation of the armature of the transmitter start relay 28, closes a path extending from battery 79 over the armature of relay 29, which is of the slow-to-operate type, to a conventional starting circuit in the transmitter 13. This causes the radio transmitter 13 to produce carrier energy of the frequency F2B which is radiated from the antenna 11 to the base station M. The carrier energy thus radiated is of short duration and is in the nature of a pulse because the other transmitter start relay 29, at the expiration of its delay period, operates its armature to disconnect battery 79 from the transmitter 13. When this spurt of carrier is received by the radio receiver RB at the base station M, it operates the codan associated therewith which, in turn, closes a circuit for effecting the lighting of the line lamp 58 in the usual manner. This last-mentioned circuit locks up so that the lamp 58 remains lighted until any one of the plugs PA, PB, or PC is inserted in the jack JB. Thus, the lighting of the line lamp 58 serves to indicate to the operator at the main station M that the customer at station V1 has acknowledged the call and is prepared to answer it over communication channel B.

The operator at the base station M accordingly inserts one of the plugs PA, PB, or PC into the jack JB. This extinguishes the line lamp 58, as was mentioned above, and also effects the starting of the radio transmitter TB in the usual manner. The transmitter TB now causes carrier energy of the frequency F1B to be radiated and this will be received by the antenna 11 at the station V1. Since the radio receiver 12 at station V1 is now tuned to the frequency F1B by the crystal X1B, it effects the reoperation of the codan 32 and, in turn, the energization of the codan relay 33. Due to the fact that relay 34 is locked in its unenergized condition, as was described above, the lamp 31 will not be lighted at this time. It should be noted that the junction point 73 remains grounded without interruption as the outer contacts of the codan relay 33 are of the make-before-break type and therefore close a path from ground 37 over the operated outer armature of relay 33 and released outer armature and contact of relay 34 before the break contacts of relay 33 are opened. This serves to maintain the receiver control relay 27 and the transmitter start relays 28 and 29 energized. The system is thus placed in the proper condition for two-way communication over channel B. During the course of this communication, the customer at station V1 presses the push-to-talk button 15 whenever he wishes to transmit.

After communication has been concluded, the operator at the base station M removes the plug from the jack JB which stops the operation of the transmitter TB, and the customer at station V1 replaces his handset 14 on the hook switch 36. The upper hook switch contacts now open to disconnect ground 72 from battery 35 thereby opening the circuit described above for locking relay 34 in its unoperated condition. The middle hook switch contact is also opened at this time to disconnect ground 37 from the energizing circuits of the ratchet lock relay 38, the receiver control relay 27, and the transmitter start relays 28 and 29. These relays now release their armatures to disconnect the earphone 44 from the radio receiver 12, to open the transmitter starting circuit, and to permit the spring 41 to pull the pawl 42 out of engagement with the ratchet 43. The release of the ratchet 43 allows the spring 45 to pull the switch arm 19 down to the contact $a$ thereby opening the energizing circuits of relays 23 and 24. At this same time, the ground 37 is connected to the bottom hook switch contact to complete the circuit for energizing relay RS which operates its armature to effect the tuning of the radio receiver 12 to the selective calling channel frequency FS. In this manner, the customer's station V1 is restored to its idle condition with all of its equipment placed in condition for receiving another selective calling signal.

In the event that the customer at station V1 wishes to initiate a call, he removes his handset 14 from the hook switch 36 thereby opening the bottom hook switch contact and disconnecting ground 37 from battery 20. This causes relay RS to release its armature to discontinue the control of the radio receiver 12 by the crystal XS. The middle hook switch contact now closes to complete a circuit extending from ground 37 over conductor 46, switch arm 19, contact $a$, and then through the windings of relays R1A and R2A to batteries 21 and 22. Relays R1A and R2A now become energized and operate their armatures to apply ground to crystals X1A and X2A thus preparing the receiver 12 and the transmitter 13 for operation over channel A.

If channel A is idle, then the codan 32, which was operated by the continuously radiated calling carrier FS, will discontinue its operation. Consequently, at the expiration of its delay period, the armatures of the codan relay 33 will move to their released positions with the result that contacts associated with the outer armature of relay 33 will connect ground 37 to the junction point 73 to complete the energizing circuits of the receiver control relay 27 and the transmitter start relays 28 and 29 as was described above. The release of the inner armature of relay 33 opens the energizing circuit of relay 34 thereby causing it to release its armatures. The release of the outer armature of relay 34 opens the circuit for energizing the lamp 31. The release of the inner armature of relay 34 connects ground 72 over the upper hook switch contacts to battery 35 thereby locking relay 34 in its unenergized condition so that the lamp 31 will not be lighted when carrier is subsequently received over channel A. Absence of illumination in the lamp 31 serves to inform the customer that channel A is idle. Accordingly, the customer presses his push-to-talk button 15 and proceeds with his call.

However, if channel A is busy, then the codan 32 will be operated and the armatures of the slow-to-release codan relay 33 will be held operated without interruption as was described above. Under this condition, the operated inner armature of relay 33 will maintain closed the circuit for energizing relay 34 which accordingly holds its armatures operated. A path will now be closed extending from ground 37, over the closed middle hook switch contact, over the operated outer armature of relay 33 operated outer armature of relay 34, and then through the call lamp 31 to battery 31$a$. The closure of this path effects the lighting of the lamp 31 thus indicating to the customer that channel A is busy and that he should operate the channel selecting switch arm 19 to select another communication channel in the manner described above.

This particular embodiment of the invention has been described in order to explain the principles and features of operation of the invention. Various modifications thereof may be made within the spirit and scope of the invention. For example, instead of employing a manually operable channel-selector, each customer's station could be equipped with an automatically operable channel-selector. One way in which the channel-selector could be operated automatically would be to employ a conventional stepper magnet the energization of which could be controlled by the codan relay 33 for operating the ratchet 43 step-by-step and thereby successively moving the channel-selector arm 19 from its contact *a* to contact *b* and then to contact *c*.

What is claimed is:

1. In a radiotelephone communication system having a plurality of radiant energy communication channels allotted thereto for the transmission of carrier waves, a communication station comprising in combination radiotelephone transmitting and receiving equipments for transmitting and receiving carrier waves, a telephone instrument, a coupling circuit for electrically coupling said instrument to said radiotelephone receiving equipment, a starting circuit for effecting the starting of said radiotelephone transmitting equipment, both of said circuits being normally open, a holder for holding said instrument during idle periods, channel-selecting means for selectively conditioning said equipments for operation with any one of said channels, said channel-selecting means being normally disabled, said system having a calling channel distinct from said communication channels, electroresponsive means for tuning only said radiotelephone receiving equipment to said calling channel, an indicator for indicating the selection of a busy channel by said channel-selecting means, a circuit for energizing said indicator, said energizing circuit having two normally open portions, means actuated by the removal of said instrument from said holder for closing one of said normally open portions of said energizing circuit and for disabling said electroresponsive means and for enabling said channel-selecting means, and a device responsive to the selection of a busy channel by said channel-selecting means for maintaining said coupling and starting circuits open and for effecting the closing of the other normally open portion of said energizing circuit.

2. In a radiotelephone communication system in accordance with claim 1 and having a first instrumentality at said communication station for closing said coupling circuit, and a second instrumentality at said station for closing said starting circuit, said device being responsive to the selection of an idle channel by said channel-selecting means for effecting the opening of said second portion of said energizing circuit and for effecting the closing of said coupling and starting circuits by said first and second instrumentalities.

3. A radiotelephone communication system having a plurality of radiant energy communication channels allotted thereto for the transmission of carrier waves, said system having a first communication station provided with means for transmitting selective calling signals over an assigned one of said channels, a second communication station comprising in combination radiotelephone transmitting and receiving equipments for transmitting and receiving carrier waves, channel-selecting means for effecting the selective tuning of said equipments for operation with any one of said channels except said assigned channel, means responsive to an idle condition at said second station for effecting the tuning of said receiving equipment to said assigned selective calling channel, an indicating device, a selective signal operated device responsive to the reception of an assigned selective calling signal by said radiotelephone receiving equipment for operating said indicating device, a carrier operated device having a time delay, said carrier operated device being responsive to carrier current received over a busy channel selected by said channel-selecting means for maintaining said indicating device in an operated condition after it has been operated by said selective signal operated device.

DOREN MITCHELL.

References Cited in the file of this patent

UNITED STATES PATENTS

| Number | Name | Date |
|---|---|---|
| 2,408,085 | Meacham | Sept. 24, 1946 |
| 2,440,239 | Almquist | Apr. 27, 1948 |
| 2,479,701 | Ress | Aug. 23, 1949 |